(12) United States Patent
Topete Uribe et al.

(10) Patent No.: US 11,361,203 B1
(45) Date of Patent: Jun. 14, 2022

(54) PIXEL GENERATION WITH SHIFTING WINDOWS

(71) Applicant: Hewlett-Packard Development Company, L.P., Spring, TX (US)

(72) Inventors: Lorena Topete Uribe, Vancouver, WA (US); Jordan Le, Vancouver, WA (US); Joshua I. Urlaub, Vancouver, WA (US)

(73) Assignee: Hewlett-Packard Development Company, L.P., Spring, TX (US)

(*) Notice: Subject to any disclaimer, the term of this patent is extended or adjusted under 35 U.S.C. 154(b) by 0 days.

(21) Appl. No.: 17/330,797

(22) Filed: May 26, 2021

(51) Int. Cl.
*G06K 15/02* (2006.01)
*G06F 3/12* (2006.01)

(52) U.S. Cl.
CPC ....... *G06K 15/1868* (2013.01); *G06F 3/1208* (2013.01); *G06F 3/1252* (2013.01); *G06K 15/1851* (2013.01)

(58) Field of Classification Search
CPC .............. G06K 5/1868; G06K 15/1851; G06F 3/1208; G06F 3/1252
See application file for complete search history.

(56) References Cited

U.S. PATENT DOCUMENTS

2016/0072982 A1* 3/2016 Muraishi ............ G06K 15/1878
358/2.1
2021/0243362 A1* 8/2021 Castillo .............. H04N 5/23218

* cited by examiner

*Primary Examiner* — Juan M Guillermety
(74) *Attorney, Agent, or Firm* — Brooks Cameron & Huebsch PLLC (57) ABSTRACT

In some examples, the disclosure describes a computing device that includes instructions to: position an image with a first aspect ratio within a boundary with a second aspect ratio, select a window that includes a portion of the image and a portion of the boundary, predict transitional pixels into the portion of the boundary based on proximate pixels of the image within the selected window, and generate the transitional pixels into the portion of the boundary.

15 Claims, 6 Drawing Sheets

PIXEL GENERATION WITH SHIFTING WINDOWS

BACKGROUND

A digital image can include a plurality of pixels arranged within a particular aspect ratio. The plurality of pixels can have a particular resolution at the particular aspect ratio. In some examples, the resolution of the pixels can be altered when the aspect ratio is altered. In some examples, the digital image can be printed at a plurality of different aspect ratios on different sized print media.

DETAILED DESCRIPTION

A user may utilize a computing device for various purposes, such as for business and/or recreational use. As used herein, the term "computing device" refers to an electronic system having a processor resource and a memory resource. Examples of computing devices can include, for instance, a laptop computer, a notebook computer, a desktop computer, networking device (e.g., router, switch, etc.), conference phone, and/or a mobile device (e.g., a smart phone, tablet, personal digital assistant, smart glasses, a wrist-worn device, etc.), among other types of computing devices.

Electronic devices such as computing devices can be utilized to modify images to be printed on a print medium using a printing device. As used herein, a printing device can include a device that can deposit a print substance on a print medium to generate an image on the print medium. As used herein, the print substance can be an ink, toner, or other substance that can be deposited on a substrate such as a print medium. As used herein, a print medium or substrate can be a physical medium that can receive the print substance to generate an image. In some examples, the printing device can utilize plurality of differently sized print media. In some examples, a size of an image to be printed on a print medium can be a different size than the print medium, which can create a border of blank print medium that surrounds the printed image on the print medium.

In some examples, a digital image can be adjusted to fit the size of a particular print medium. For example, a size of the digital image can be increased and/or decreased to better fit the size of the print medium. However, the aspect ratio of the digital image may be different than the aspect ratio of the print media. In these examples, the aspect ratio of the digital image can remain constant and a border can exist between an edge of the print media and the image when the digital image is printed on the print media. In other examples, the aspect ratio of the digital image can be altered, which can distort the quality of the image. Neither of cases may produce a relatively high quality image at the aspect ratio of the print media.

The present disclosure relates to generating pixels (e.g., transitional pixels, etc.) for an area between an edge of an image and an edge of the print media to be used when printing the image. In this way, the aspect ratio of the digital image can be expanded without altering the image quality or causing distortion of the image by altering the aspect ratio. That is, the present disclosure can utilize a plurality of windows that include a portion of the image and a portion of a border that exists between the image and a size of the print media to artificially generate additional pixels of the image within the border. In some examples, the plurality of windows can be utilized to expand an edge of the image a plurality of times such that portions of the border are filled within predicted generated pixels of the image such that the digital image is expanded to the aspect ratio and/or size of the print media. In these examples, the image with the generated edges of transitional pixels can be utilized to print on the print media such that the image appears to extend to the edges of the print media.

Figure 1:
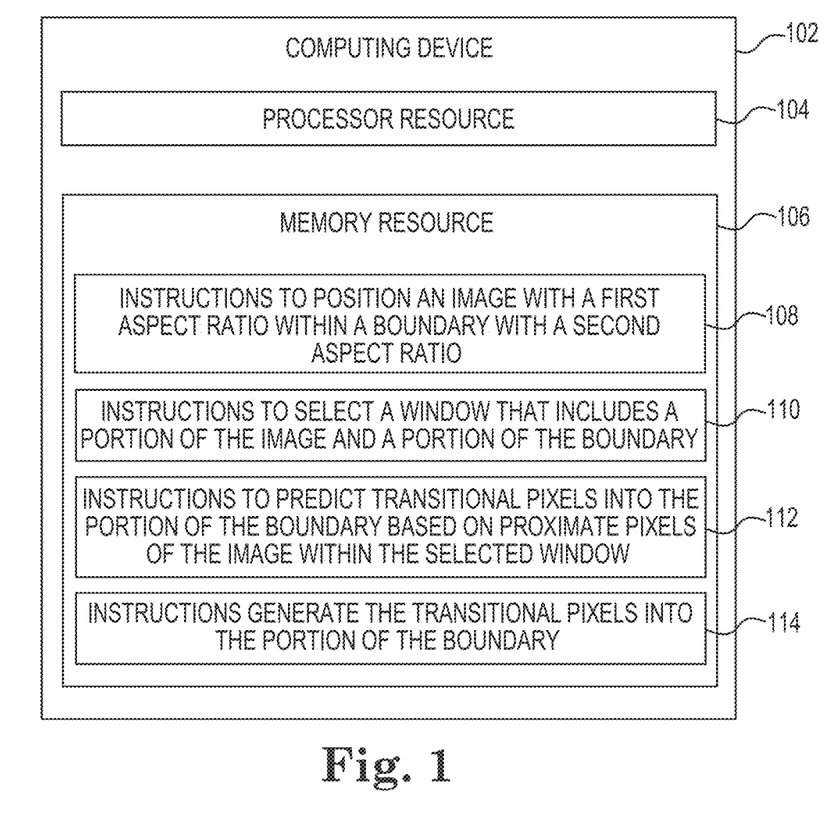
FIG. 1 illustrates an example of a computing device for pixel generation with shifting windows.

FIG. 1 illustrates an example of a computing device for pixel generation with shifting windows. In some examples the computing device 102 can include a processor resource 104 communicatively coupled to a memory resource 106, As described further herein, the memory resource 106 can include instructions 108, 110, 112, 114, that can be executed by the processor resource 104 to perform particular functions. In some examples, the computing device 102 can be associated with a printing device and/or imaging device (e.g., camera, scanner, optical sensor, etc.).

The computing device 102 can include components such as a processor resource 104, As used herein, the processor resource 104 can include, but is not limited to: a central processing unit (CPU), an application specific integrated circuit (ASIC), a field programmable gate array (FPGA), a metal-programmable cell array (MPCA), a semiconductor-based microprocessor, or other combination of circuitry and/or logic to orchestrate execution of instructions 108, 110, 112, 114. In other examples, the computing device 102 can include instructions 108, 110, 112, 114, stored on a machine-readable medium (e.g., memory resource 106, non-transitory computer-readable medium, etc.) and executable by a processor resource 104. In a specific example, the computing device 102 utilizes a non-transitory computer-readable medium storing instructions 108, 110, 112, 114, that, when executed, cause the processor resource 104 to perform corresponding functions.

In some examples, the computing device 102 can include instructions 108 to position an image with a first aspect ratio within a boundary with a second aspect ratio. As used herein, a boundary can include a blank area unrelated to the image that can represent a print media to be utilized to print the image. As described herein, an image, such as a digital image, that is displayed on a display device or computing device screen, can have a first aspect ratio or dimensions (e.g., width, length, etc.). As used herein, the aspect ratio can be a ratio of the dimensions of an object or thing. For example, the aspect ratio of an image displayed on a display device of the computing device 102 can be a ratio of the width of the image and the length of the image. In another example, the aspect ratio of a sheet of print media (e.g., paper, plastic, etc.) can be the ratio of the width of the sheet of print media and the length of the sheet of print media. In these examples, the aspect ratio of the digital image can be different than the aspect ratio of the sheet of print media.

In some examples, the display device of the computing device 102 can display the aspect ratio of the digital image in proportion with the aspect ratio of the sheet of print media. In these examples, the image can have the first aspect ratio with a first size and the boundary can correspond to a relative size of the sheet of print media with a second size. In this way, the computing device 102 can illustrate the size difference between the image and the sheet of print media to be utilized for printing the image on to the sheet of print media. In this way, the boundary that the image is positioned within can illustrate the boundary or blank portion of the print media if a printing device were to print the image at the first aspect ratio on to the sheet of print media.

In some previous examples, removing the boundary or blank portion of the print media can be relatively difficult without distorting the image and/or losing a portion of the image that extends beyond an edge of the sheet of print media. The present disclosure describes generating transition pixels to extend the image to an edge of the print media without altering a resolution of the original image. As described further herein, a plurality of windows can be utilized to compare an image portion with a boundary portion to generate new pixels of the image within the boundary portion to extend a dimension of the image within the selected window.

In some examples, the computing device 102 can include instructions 110 to select a window that includes a portion of the image and a portion of the boundary. As described herein, the window can be a portion of the displayed image and boundary that includes a portion of the image proximate to a portion of the boundary. As described herein, the portion of the displayed image can include a plurality of pixels that make up the image and the portion of the boundary can include a background that illustrates a blank portion of a sheet of print media if the image were to be printed at a particular size and/or aspect ratio. In this way, the boundary may not include pixels of the image when the window is selected. That is, the boundary can be a portion outside the boundaries of the image and represent the boundaries of a sheet of print media.

In some examples, the computing device 102 can analyze the image portion within the selected window. The analysis of the image portion can include determining color patterns within the image portion of the window, determining color transitions from a first edge to a second edge of the image portion, and/or determining other patterns within the image that are likely to extend within the boundary portion within the window.

In some examples, the computing device 102 can include instructions 112 to predict transitional pixels into the portion of the boundary based on proximate pixels of the image within the selected window. As described herein, the computing device 102 can analyze the image portions within the window to identify different image patterns, such as color patterns, brightness patters, contrast patterns, and/or other patterns associated with images and identify patterns that are likely to extend into the boundary portion within the window. In this way, the computing device 102 can be utilized to predict transitional pixels into the portion of the boundary based on proximate pixels of the image.

As used herein, a transitional pixel includes a pixel beyond a boundary of an image that is added to an edge of the of the image to extend the boundary of the image. In some examples, the window can be positioned on an edge of the image such that a transition exists between an edge of the image and an edge of the boundary or background that does not include pixels associated with the image. In this way, the transitional pixels can extend the borders or edges of the image without having to potentially distort the resolution of the image through a resizing operation. As used herein, a resizing operating includes altering a size or dimensions of an image without adding additional pixels to the image or removing existing pixels from the image. As described herein, a resizing operation performed on the image can distort features of the image, alter a resolution of the image, and/or alter an image quality of the image.

In some examples, the computing device 102 can include instructions 114 to generate the transitional pixels into the portion of the boundary. In some examples, generating the transitional pixels can include generating pixels to be added or stitched to an edge of the image. As used herein, adding pixels to an edge of the image can include generating new pixels that did not previously exist within the image and add or stitch the newly generated pixels to the image. In some examples, the transitional pixels that are added to the image can be utilized to extend a dimension of the image. For example, the transitional pixels can be utilized to extend an edge of the image to increase a length and/or width of the image.

In some examples, the computing device 102 can utilize a plurality of selected windows along an edge of the image and generate corresponding transitional pixels for each of the plurality of selected windows. In some examples, a window is generated a plurality of times from a first end of the boundary (e.g., edge of a simulated sheet of print media, etc.) to a second end of the boundary (e.g., edge of the image, etc.) to generate corresponding transitional pixels for each of the plurality of generated windows. In addition, the computing device 102 can select additional windows that include a portion of the original image, a portion of transitional pixels previously generated by the computing device 102, and a portion of the boundary that extends beyond the transitional pixels previously generated.

That is, in some examples, the computing device 102 can include instructions to select an additional window that includes an additional portion of the boundary and the generated transitional pixels and predict additional transitional pixels into the additional portion of the boundary based on the generated transitional pixels. In this way, the computing device 102 can extend the image to an edge of the boundary and/or to a size of selected print media utilizing a plurality of generated transitional pixels.

Figure 2:
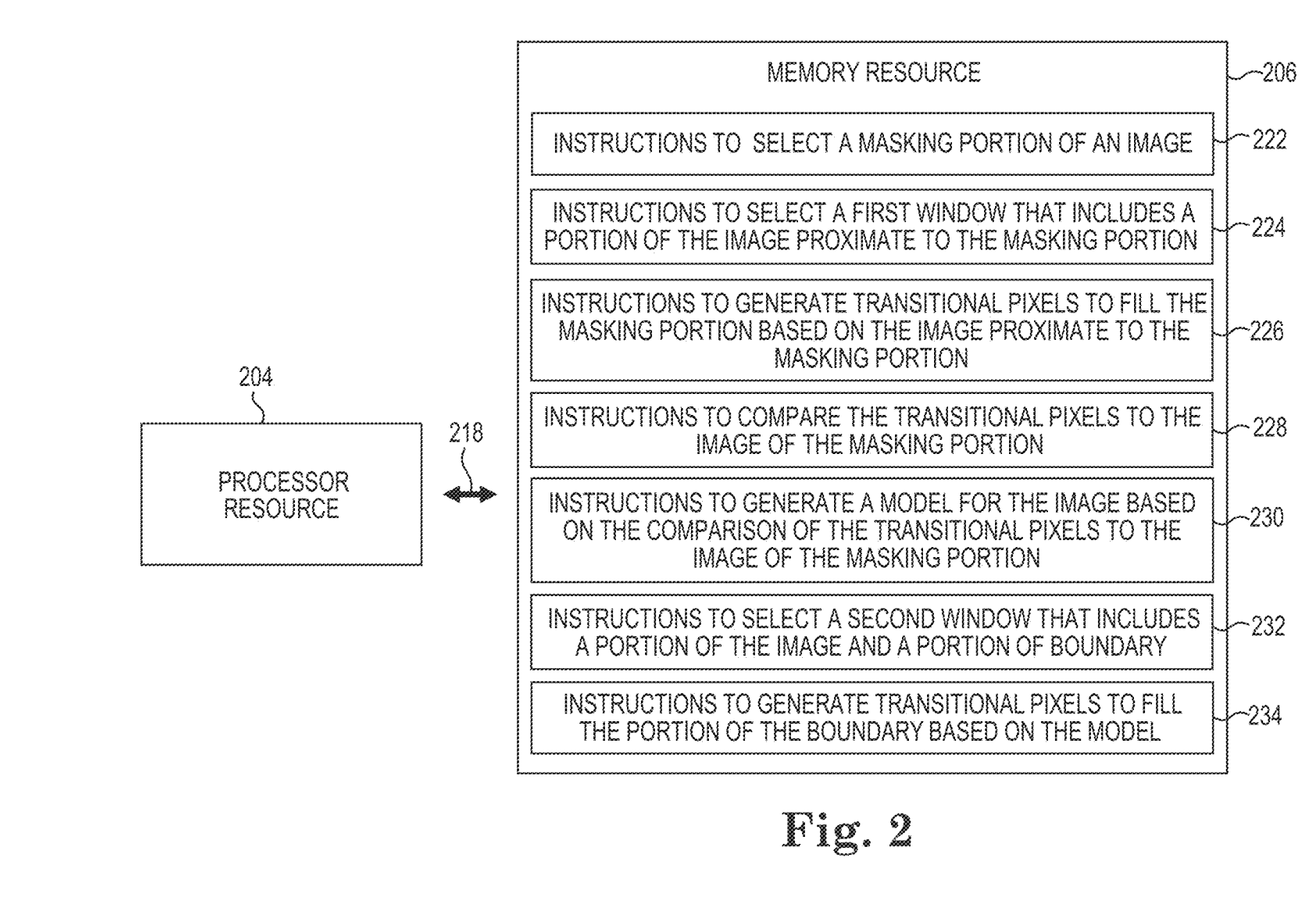
FIG. 2 illustrates an example of a memory resource for pixel generation with shifting windows.

FIG. 2 illustrates an example of a memory resource 206 for pixel generation with shifting windows. In some examples, the memory resource 206 can be a part of a computing device or controller that can be communicatively coupled to a computing system. For example, the memory resource 206 can be part of a computing device 102 as referenced in FIG. 1. In some examples, the memory resource 206 can be communicatively coupled to a processor resource 204 that can execute instructions 222, 224, 226, 228, 230, 232, 234 stored on the memory resource 206. For example, the memory resource 206 can be communicatively coupled to the processor resource 204 through a communication path 218. In some examples, a communication path 218 can include a wired or wireless connection that can allow communication between devices and/or components within a single device.

The memory resource 206 may be electronic, magnetic, optical, or other physical storage device that stores executable instructions. Thus, a non-transitory machine readable medium (MRM) (e.g., a memory resource 206) may be, for example, a non-transitory MRM comprising Random-Access Memory (RAM), read-only memory (ROM), an Electrically-Erasable Programmable ROM (EEPROM), a storage drive, an optical disc, and the like. The non-transitory machine readable medium (e.g., a memory resource 206) may be disposed within a controller and/or computing device. In this example, the executable instructions 222, 224, 226, 228, 230, 232, 234 can be "installed" on the device. Additionally, and/or alternatively, the non-transitory machine readable medium (e.g., a memory resource) can be a portable, external or remote storage medium, for example, that allows a computing system to download the instructions 222, 224, 226, 228, 230, 232, 234 from the portable/external/remote storage medium. In this situation, the executable instructions may be part of an "installation package", As described herein, the non-transitory machine readable medium (e.g., a memory resource 206) can be encoded with executable instructions for performing performance metric calculations.

The instructions 222, when executed by a processor resource such as the processor resource 204, can include instructions to select a masking portion of an image. As used herein, a masking portion refers to an area that is assigned a masking value or an area that replaces a content value with a particular masking value. For example, the masking portion can change a range of values within the content of the image portion to represent the color space for a given pixel from the original value to a 'masking' value of 0 or 1 or an equivalent 'masking' value different from the original value used to represent the original pixel value range that represented the image portion. Thus, the original values can be removed from the memory space associated with the image portion being processed.

In some examples, the masking portion can be positioned along an edge of the image based on a boundary that exists between an edge of the image content and an edge of a print media. In some examples, a boundary can exist when the contents of the image is superimposed or overlaid on top of a sheet of print media. In these examples, a boundary can then be observed between the edges of the image content and the borders of the print media. As described herein, the processor resource 204 can process the masking portion or boundary of the image with masked portions that have modified the original data or inserted 'masked' values for the newly increased array dimensions.

In some examples, the masking portion can be positioned along an edge of the image to simulate a border or boundary between the image content and an edge of a sheet of print media. In this way, the masking portion can be utilized to train an application for generating transitional pixels within a border between the image content and an edge of the print media by first utilizing the masking portion to generate training data for the particular image.

The instructions 224, when executed by a processor resource such as the processor resource 204, can include instructions to select a first window that includes a portion of the image proximate to the masking portion. In some examples, the first window can be a selected dimension of pixels that includes a portion of the image proximate to the masking portion and a portion of the masking portion. In this way, the processor resource 204 can include instructions to predict a plurality of transitional pixels within the masking portion of the first window. As described herein, the predicted transitional pixels can be predicted pixels of how the image would extend through the masking portion of the first window if the image were continued. In some examples, the transitional pixels can be predicted by a number of convolutional methods of deconstructing and reconstructing the image portion and identify patterns that can be extended or are likely to extend into the masking portion within the first window.

In some examples, the image portion within the first window can include a greater area than the masking portion area within the window. In this way, the quantity of predicted transitional pixels can be based on a relatively large quantity of proximate pixels of the image portion within the first window. For example, the quantity of pixels of the image portion within the first window can be two times greater than the quantity of predicted transitional pixels. In another example, the quantity of pixels of the image portion within the first window can be greater than three times the quantity of predicted transitional pixels. In this way, the predicted transitional pixels can be based on a relatively large quantity of image pixels.

The instructions 226, when executed by a processor resource such as the processor resource 204, can include instructions to generate transitional pixels to fill the masking portion based on the image proximate to the masking portion. As described herein, transitional pixels can be generated to expand an edge or boundary of the image into the masking portion. In some examples, the generated transitional pixels can represent a predicted color and/or image properties based on the predicted transitional pixels. In some examples, the generated transitional pixels can be new pixels that were not previously included within the image or altered from the image. In some examples, the generated transitional pixels can be attached to the image to extend the length or width of the image into the masking portion.

The instructions 228, when executed by a processor resource such as the processor resource 204, can include instructions to compare the transitional pixels to the image of the masking portion. As described herein, the masking portion can cover or "mask" a portion of the image. In these examples, the generated transitional pixels that extended into the masking portion can be compared to the pixels of the original image that were masked by the masking portion. In this way, errors or differences between the pixels of the generated transitional pixels and the pixels of the image that were masked by the masking portion can be used to improve the prediction method and/or generate a model that can be utilized to predict transitional pixels into a boundary surrounding the image as described herein.

The instructions 230, when executed by a processor resource such as the processor resource 204, can include instructions to generate a model for the image based on the comparison of the transitional pixels to the image of the masking portion. In some examples, a model for generating transitional pixels can be generated based on the comparison between the transitional pixels generated into the masking portion and the pixels of the original image masked by the masking portion. In some examples, the model can be utilized to alter or update a convolutional model for deconstructing and reconstructing images to identify patterns of the image on a pixel level. In this way, the model can be utilized to improve predicting transitional pixels that extend beyond an original border of an image to increase an aspect ratio of the image without distorting the resolution of the original image.

The instructions 232, when executed by a processor resource such as the processor resource 204, can include instructions to select a second window that includes a portion of the image and a portion of boundary. In some examples, the model can be utilized to predict transitional pixels that extend into a boundary surrounding the image. In this way, a second window can be selected that includes a portion of the image and a portion of the boundary. In some examples, the portion of the image can be a previously masked portion of the image. For example, the masked portion of the image can be positioned along the same edge of the image as the portion of the boundary. In this way, the model can be representative of the particular edge of the image that includes the boundary. In some examples, this can improve the prediction of the transitional pixels into the boundary, especially when the image includes different patterns along different edges or portions of the image.

The instructions 234, when executed by a processor resource such as the processor resource 204, can include instructions to generate transitional pixels to fill the portion of the boundary based on the model. As described herein, the processor resource 204 can determine patterns of the image within the second window to determine transitional pixels that can be utilized to extend the image into the boundary such that the image can be expanded utilizing the generated transitional pixels. As described herein, the generated transitional pixels can be added to the proximate pixels of the image within the second window to expand the image into the boundary portion of the second window.

Figure 3:
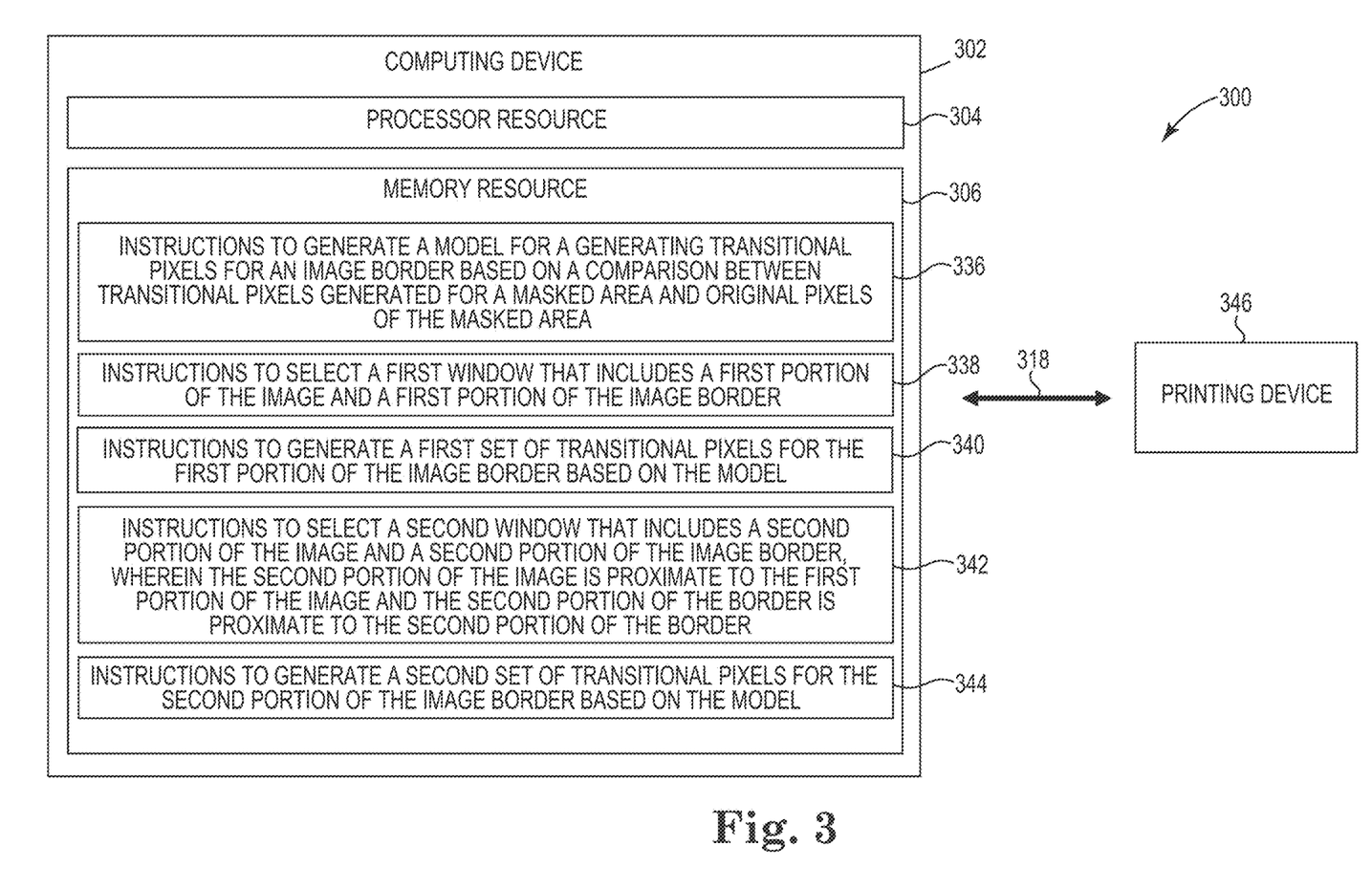
FIG. 3 illustrates an example of a system for pixel generation with shifting windows.

FIG. 3 illustrates an example of a system 300 for pixel generation with shifting windows. In some examples the computing device 302 can be a device that includes a processor resource 304 communicatively coupled to a memory resource 306. As described herein, the memory resource 306 can include or store instructions 336, 338, 340, 342, 344, that can be executed by the processor resource 304 to perform particular functions.

In some examples, the computing device 302 can be communicatively coupled to a printing device 346 using a communication path 318. The printing device 346 can be utilized to generate images on print media utilizing a print substance. In some examples, the computing device 302 can transmit a digital image through the communication path 318 to the printing device 346 and the printing device 346 can convert the digital image to a printed image on the print media. In some examples, a print media size can be selected and displayed on a display device of the computing device 302 to represent a boundary that surrounds an image displayed on the display device. In this way, the display device can illustrate the dimensions or aspect ratio of the image compared to the dimensions or aspect ratio of the print media to be utilized by the printing device 346.

As described herein, the computing device 302 can be utilized to increase the size of a digital image to fit the aspect ratio and/or dimensions of a selected sheet of print media without resizing the image. In this way, the digital image can be printed on to a particular size of print media and extend to the edges of the print media without altering a resolution or distorting the image.

In some examples, the computing device 302 can include instructions 336 that can be executed by a processor resource 304 to generate a model for a generating transitional pixels for an image border based on a comparison between transitional pixels generated for a masked area and original pixels of the masked area. As described herein, a model for generating transitional pixels can include a model for predicting a pattern that extends beyond an edge of an original image. In some examples, the model can be generated by comparing generated transitional pixels for a masked area to original pixels of the image that were masked by the masked area. In this way, a convolutional method of analyzing pixels to identify patterns can be updated by the model to more accurately predict the transitional pixels for a boundary or area outside an edge of the image.

In some examples, the computing device 302 can include instructions 338 that can be executed by a processor resource 304 to select a first window that includes a first portion of the image and a first portion of the image border. In some examples, the image can include an edge with a border or background that can represent the print media to be utilized by the printing device 346 to print the image. In this example, the first window can include dimensions for the portion of the image and the portion of the image border or boundary. As described herein, the first window can be positioned to surround a particular dimension of the image and a particular dimension of the image border. In some examples, the particular dimensions of the image can be larger than the particular dimensions of the image border. In this way, transitional pixels generated to be positioned within the first portion of the image border can be based on a relatively larger area of the first portion of the image.

In some examples, the computing device 302 can include instructions 340 that can be executed by a processor resource 304 to generate a first set of transitional pixels for the first portion of the image border based on the model. In some examples, the first set of transitional pixels can be connected or stitched to the edge of the image such that the first set of transitional pixels fill the first portion of the image border and appear to extend the image dimension to through the first window. In some examples, each of the first set of transitional pixels can be positioned based on a corresponding set of pixels within the first image portion such that the first set of transitional pixels are positioned proximate to the corresponding set of pixels within the first image portion. In some examples, a first plurality of transitional pixels of the first set of transitional pixels can be positioned proximate to a corresponding edge pixel within the first image portion. In addition, a second plurality of transitional pixels of the first set of transitional pixels can be positioned proximate to corresponding pixels of the first plurality of transitional pixels. This process of positioning pixels or connecting pixels proximate to corresponding pixels can be continued to extend the first set of transitional pixels to an edge of the first window.

In some examples, the computing device 302 can include instructions 342 that can be executed by a processor resource 304 to select a second window that includes a second portion of the image and a second portion of the image border. In some examples, the second portion of the image is proximate to the first portion of the image and the second portion of the border is proximate to the second portion of the border. In some examples, the second window can be positioned along an edge of the first window. In this way, a plurality of windows can be selected along an edge of an image to extend the edge of the image to an edge of the plurality of windows. In some examples, the second window can be positioned to include a second portion of the image that is different than the first portion of the image and include a second portion of the image border that is different than the first portion of the image border.

In some examples, the computing device 302 can include instructions 344 that can be executed by a processor resource 304 to generate a second set of transitional pixels for the second portion of the image border based on the model. In a similar way as the first set of transitional pixels, the second set of transitional pixels can be generated and positioned within the second portion of the image border to fill the second portion of the image border with the generated transitional pixels. In these examples, the generated transitional pixels can resemble a pattern of pixels of the original image portion within the selected windows.

In some examples, the first portion of the border and the second portion of the border are the same size and based on a size of a mask portion that is selected when the model generated. In these examples, the first portion of the border and the second portion of the border can be based on the size of the portion of the border utilized when determining transition pixels for a masked portion. As referenced in FIG. 4, a masked portion can allow the model to be refined or to be generated by comparing a predicted set of transition pixels to masked pixels of the actual image. In this way, the quantity of pixels to be filled within the first portion of the border and the second portion of the border can be the same quantity of pixels that were used when generating transitional pixels for the masked portion.

In some example, the second portion of the image can overlap a portion of the first portion of the image and the second portion of the image border can overlap a portion of the first portion of the image border. In these examples, a portion of the first set of transitional pixels can be replaced or redone by the second set of transitional pixels. In some examples, the portion of the first set of transitional pixels can be replaced utilizing the second window that overlaps a portion of the first window to allow for relatively better transition between the first set of transitional pixels and the second set of transitional pixels.

Figure 4:
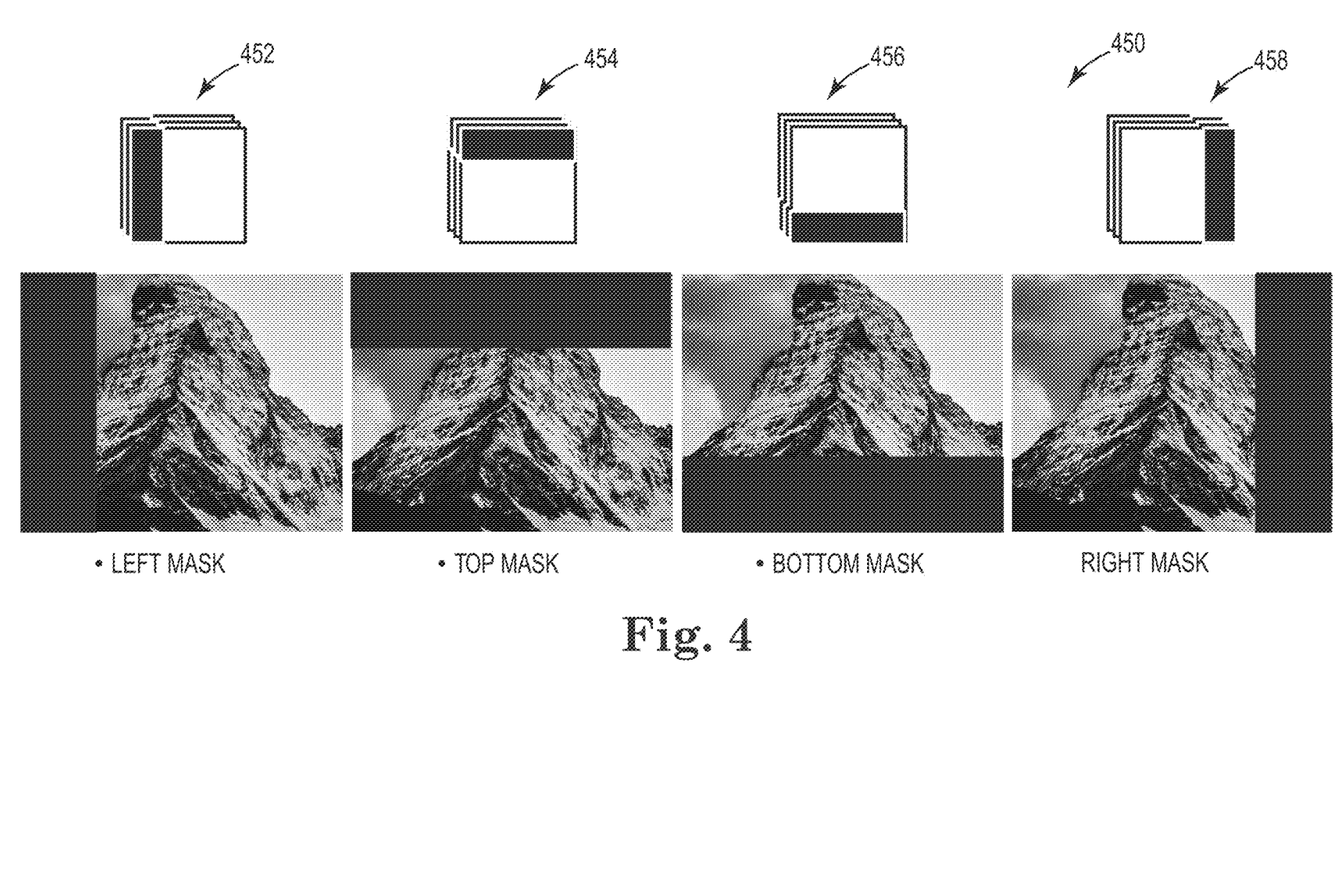
FIG. 4 illustrates an example of a masking process for pixel generation with shifting windows.

FIG. 4 illustrates an example of a masking process 450 for pixel generation with shifting windows. In some examples, the masking process 450 can be utilized to generate a model for transitional pixel generation as described herein. In some examples, the masking process 450 can illustrate a plurality of masks 452, 454, 456, 458 that can be positioned on corresponding edges of an image. When one of the plurality of masks 452, 454, 456, 458 is applied over a corresponding portion of the image, a plurality of windows can be selected and a set of corresponding transitional pixels can be generated to fill the portion of the plurality of masks 452, 454, 456, 458. In this way, the original pixels of the image covered by the plurality of masks 452, 454, 456, 458 can be compared to the generated transitional pixels such that a model can be generated or updated in response to the comparison.

In some examples, the masking process 450 can illustrate a left mask 452, a top mask 454, a bottom mask 456, and a right mask 458. In some examples, a mask from the plurality of masks 452, 454, 456, 458 can be selected based on a boundary or image border. For example, the image can include a boundary or image border that extends beyond a right side and a left side of the image. In this example, the left mask 452 and the right mask 458 can be selected to be utilized for generating a model to be utilized to fill the boundary or image border that extends beyond the right side and left side of the image. In some examples, each of the plurality of masks 452, 454, 456, 458 can be utilized when a boundary or image border exists for each edge of the image. In some examples, a separate model can be generated for each of the plurality of masks 452, 454, 456, 458 and utilized for a corresponding edge when generating transitional pixels for the corresponding edge of the image.

As described herein, transitional pixels can be generated to fill the plurality of masks 452, 454, 456, 458 and the original pixels that are masked by the plurality of masks 452, 454, 456, 458 can be compared to the transitional pixels to determine differences. These differences can be utilized to generate a model for each of the plurality of masks 452, 454, 456, 458 that can be utilized to generate transitional pixels for correspond edges of the image that includes a boundary or image border.

Figure 5:
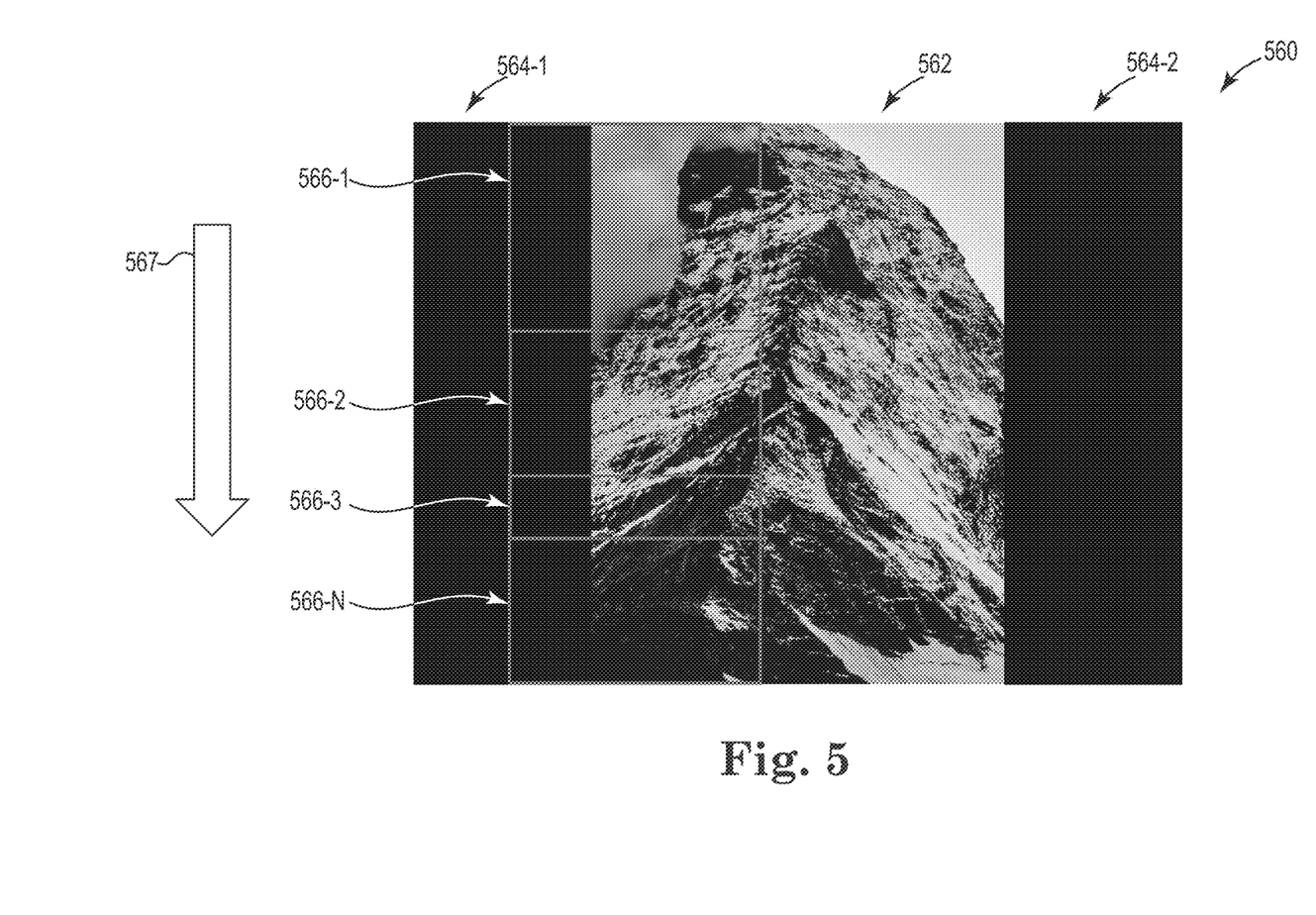
FIG. 5 illustrates an example of a process for pixel generation with shifting windows.

FIG. 5 illustrates an example of a process 560 for pixel generation with shifting windows 566-1, 566-2, 566-3, 566-N. In some examples, the image 562 can include a first boundary 564-1 and a second boundary 564-2. As illustrated in FIG. 5, the first boundary 564-1 can be a left boundary or left image border and the second boundary 564-2 can be a right boundary or a right image boundary. In other examples, the image 562 can include a top boundary and/or a bottom boundary. In further examples, the image 562 can include a top boundary, a right boundary, a left boundary, and/or a bottom boundary.

As described herein, a model can be generated that corresponds to the first boundary 564-1 and a model can be generated that corresponds to the second boundary 564-2. In some examples, the model can be utilized to generate transitional pixels to fill the first boundary 564-1 and/or second boundary 564-2 to extend the aspect ratio of the image 562 without a resizing operation. That is, the image 562 is not stretched to fill the first boundary 564-1 and/or the second boundary 564-2. In contrast, a plurality of transitional pixels are generated and connected to the image 562 to expand into the first boundary 564-1 and/or the second boundary 564-2.

As described herein, the process 560 can include selecting a plurality of windows 566-1, 566-2, 566-3, 566-N along an edge between the image 562 and the boundary 564-1. In some examples, the plurality of windows 566-1, 566-2, 566-3, 566-N can be differently sized windows that include dimensions that include a portion of the image 562 and a portion of the boundary 564-1. As described herein, the model can be utilized to identify patterns of the image 562 within the plurality of windows 566-1, 566-2, 566-3, 566-N to determine transitional pixels to fill the boundary 564-1 within the plurality of windows 566-1, 566-2, 566-3, 566-N. Although the plurality of windows 566-1, 566-2, 566-3, 566-N are illustrated as proximately positioned along the left edge of the image 562, some of the plurality of windows 566-1, 566-2, 566-3, 566-N can be overlapped as described herein.

Figure 6:
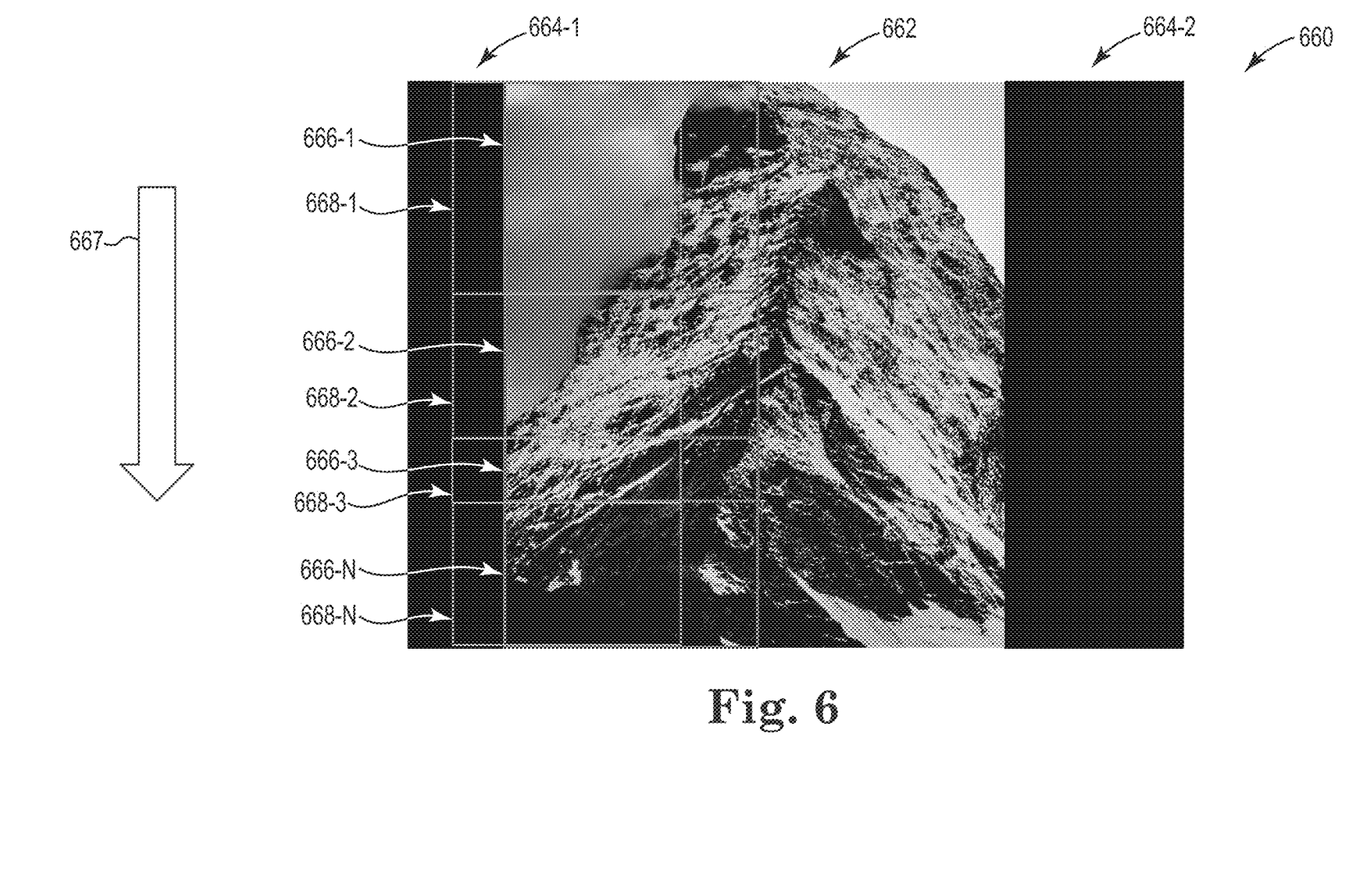
FIG. 6 illustrates an example of a process for pixel generation with shifting windows.

As illustrated in FIG. 5, the portion of the image 562 within the plurality of windows 566-1, 566-2, 566-3, 566-N is relatively larger than the portion of the boundary 564-1 within the plurality of windows 566-1, 566-2, 566-3, 566-N. In this way, a greater area of the image 562 can be utilized to generate transitional pixels to fill the boundary 564-1 within the plurality of windows 566-1, 566-2, 566-3, 566-N. As illustrated in FIG. 6, the transitional pixels utilized to fill the boundary 564-1 within the plurality of windows 566-1, 566-2, 566-3, 566-N can be utilized as image portions for an additional plurality of windows.

In some examples, the transitional pixels can be generated from a top portion of the image 562 to the bottom portion of the image 562 as illustrated by arrow 567. However, in other examples, the transitional pixels can be generated in a non-linear process. For example, the transitional pixels for the window 566-1 can be generated, followed by the transitional pixels for the window 566-3, followed by the transitional pixels for the window 566-4, and followed by the transitional pixels for the window 566-N.

FIG. 6 illustrates an example of a process 660 for pixel generation with shifting windows 666-1, 666-2, 666-3, 666-N, 668-1, 668-2, 668-3, 668-N. In some examples, the process 660 can be performed subsequent to the process 560 as illustrated in FIG. 5. For example, the image 662 can include a first boundary 664-1 and a second boundary 664-2. As illustrated in FIG. 6, the first boundary 664-1 can be a left boundary or left image border and the second boundary 664-2 can be a right boundary or a right image boundary.

In some examples, the plurality of windows 666-1, 666-2, 666-3, 666-N, 668-1, 668-2, 668-3, 668-N can include a first set of windows 666-1, 666-2, 666-3, 666-N, and a second set of windows 668-1, 668-2, 668-3, 668-N. In some examples, the first set of windows 666-1, 666-2, 666-3, 666-N can have a portion filled with transitional pixels from process 560 as illustrated in FIG. 5. In this way, the second set of windows 668-1, 668-2, 668-3, 668-N can include a portion of the image 662, a portion of the transitional pixels generated for the first set of windows 666-1, 666-2, 666-3, 666-N, and a portion of the first boundary 664-1. In some examples, the model utilized to generate the transitional pixels for the first set of windows 666-1, 666-2, 666-3, 666-N can be utilized to generate transitional pixels for the second set of windows 668-1, 668-2, 668-3, 668-N.

In some examples, the transitional pixels can be generated from a top portion of the image 662 to the bottom portion of the image 662 as illustrated by arrow 667. However, in other examples, the transitional pixels can be generated in a non-linear process. For example, the transitional pixels for the window 668-1 can be generated, followed by the transitional pixels for the window 668-3, followed by the transitional pixels for the window 668-4, and followed by the transitional pixels for the window 668-N.

In the foregoing detailed description of the disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the disclosure. Further, as used herein, "a" refers to one such thing or more than one such thing.

The figures herein follow a numbering convention in which the first digit corresponds to the drawing figure number and the remaining digits identify an element or component in the drawing. For example, reference numeral 102 may refer to element 102 in FIG. 1 and an analogous element may be identified by reference numeral 302 in FIG. 3. Elements shown in the various figures herein can be added, exchanged, and/or eliminated to provide additional examples of the disclosure. In addition, the proportion and the relative scale of the elements provided in the figures are intended to illustrate the examples of the disclosure, and should not be taken in a limiting sense.

It can be understood that when an element is referred to as being "on," "connected to", "coupled to", or "coupled with" another element, it can be directly on, connected, or coupled with the other element or intervening elements may be present. In contrast, when an object is "directly coupled to" or "directly coupled with" another element it is understood that are no intervening elements (adhesives, screws, other elements) etc.

The above specification, examples, and data provide a description of the system and method of the disclosure. Since many examples can be made without departing from the spirit and scope of the system and method of the disclosure, this specification merely sets forth some of the many possible example configurations and implementations,

What is claimed is:

1. A computing device, comprising:
   a processor resource; and
   a non-transitory memory resource storing machine-readable instructions stored thereon that, when executed, cause the processor resource to:
   position an image with a first aspect ratio within a boundary with a second aspect ratio;
   select a window that includes a portion of the positioned image and a portion of the boundary;
   predict transitional pixels into the portion of the boundary based on proximate pixels of the positioned image within the selected window; and
   generate the transitional pixels into the portion of the boundary.

2. The computing device of claim 1, comprising instructions to select an additional window that includes an additional portion of the boundary and the generated predicted transitional pixels.

3. The computing device of claim 2, comprising instructions to predict additional transitional pixels into the additional portion of the boundary based on the generated predicted transitional pixels.

4. The computing device of claim 1, wherein the boundary is a blank area unrelated to the image.

5. The computing device of claim 1, wherein the boundary is a boundary for a particular print media size to be printed.

6. The computing device of claim 5, wherein the processor resource is to extend transitional pixels to fill the boundary with generated predicted transitional pixels.

7. The computing device of claim 1, wherein the window is generated a plurality of times from a first end of the boundary to a second end of the boundary to generate corresponding transitional pixels for each of the plurality of generated windows.

8. A non-transitory memory resource storing machine-readable instructions stored thereon that, when executed, cause a processor resource to:
   select a masking portion of an image;
   select a first window that includes a portion of the image proximate to the selected masking portion;
   generate transitional pixels to fill the selected masking portion based on the image proximate to the selected masking portion;
   compare the transitional pixels to the image of the selected masking portion;
   generate a model for the image based on the comparison of the transitional pixels to the image of the selected masking portion;
   select a second window that includes a portion of the image and a portion of boundary; and
   generate transitional pixels to fill the portion of the boundary based on the generated model.

9. The memory resource of claim 8, wherein the boundary is an area to be printed on print media without image data associated with the image.

10. The memory resource of claim 9, wherein a size of the image is extended by the generated transitional pixels without altering the aspect ratio of an original portion of the image.

11. The memory resource of claim 8, wherein a size of the second window is based on a size of the first window.

12. A system, comprising:
   a computing device, comprising a processor resource to:
   generate a model for a generating transitional pixels for an image border based on a comparison between transitional pixels generated for a masked area and original pixels of the masked area;
   select a first window that includes a first portion of the image and a first portion of the image border;
   generate a first set of transitional pixels for the first portion of the image border based on the generated model;

select a second window that includes a second portion of the image and a second portion of the image border,
wherein the second portion of the image is proximate to the first portion of the image and the second portion of the border is proximate to the second portion of the border;
generate a second set of transitional pixels for the second portion of the image border based on the generated model; and
a printing device to print the image for the generated first set of transitional pixels and the generated second set of transitional pixels on a print media.

13. The system of claim 12, wherein the processor resource is to define the image border based on a size of the image and a size of the print media.

14. The system of claim 12, wherein the first portion of the image border and the second portion of the image border are a same size and based on a size of a mask portion that is selected when the model is generated.

15. The system of claim 12, wherein the first set of transitional pixels and the second set of transitional pixels are generated image data that extends from the image to an edge of the print media.

* * * * *